(12) United States Patent
Gonzalez Alvarez et al.

(10) Patent No.: US 12,275,441 B2
(45) Date of Patent: Apr. 15, 2025

(54) TROLLEY FOR INSPECTING RAILWAY CONSTRUCTION PARAMETERS

(71) Applicant: TELEFONOS, LINEAS Y CENTRALES, S.A., Alcobendas (ES)

(72) Inventors: Cesareo Gonzalez Alvarez, Alcobendas (ES); Ruben Puente Martinez, Alcobendas (ES); Omar Beneitez Vazquez, Alcobendas (ES)

(73) Assignee: TELEFONOS, LINEAS Y CENTRALES, S.A., Alcobendas (ES)

( * ) Notice: Subject to any disclaimer, the term of this patent is extended or adjusted under 35 U.S.C. 154(b) by 924 days.

(21) Appl. No.: 17/428,849

(22) PCT Filed: Feb. 7, 2019

(86) PCT No.: PCT/ES2019/070066
§ 371 (c)(1),
(2) Date: Aug. 5, 2021

(87) PCT Pub. No.: WO2020/161366
PCT Pub. Date: Aug. 13, 2020

(65) Prior Publication Data
US 2022/0126887 A1 Apr. 28, 2022

(51) Int. Cl.
*B61D 15/10* (2006.01)
*B60M 1/28* (2006.01)

(52) U.S. Cl.
CPC .............. *B61D 15/10* (2013.01); *B60M 1/28* (2013.01)

(58) Field of Classification Search
CPC ........ B61D 15/08; B61D 15/10; B61D 15/12; B60M 1/28
See application file for complete search history.

(56) References Cited

U.S. PATENT DOCUMENTS 5,025,566 A * 6/1991 Fiechter .................. E01B 35/02
33/360
2018/0084238 A1 3/2018 Chossat et al.

FOREIGN PATENT DOCUMENTS

CN 102390405 B * 11/2013 ............... B61K 9/08
CN 105316986 A 2/2016
(Continued)

OTHER PUBLICATIONS

International Search Report for International Application No. PCT/ES2019/070066 dated Oct. 14, 2019 with English translation; 4 pages.

*Primary Examiner* — Robert J McCarry, Jr.
(74) *Attorney, Agent, or Firm* — LUCAS & MERCANTI, LLP

(57) ABSTRACT

A trolley for inspecting railway construction parameters having two frames, left and right, joined in a folding manner with a central body, wherein each frame is provided with a running assembly mounted on the free ends of the frames, wherein the running assemblies are foldable with respect to the frames and wherein a telescopic column emerges from the central body, the final section of which has a handle for operating the trolley and a tray for resting control equipment, such as a computer, wherein the tray is foldable with respect to the telescopic column and the latter is foldable with respect to the central body until it touches the top plane of the frames, forming a compact, portable assembly that can be operated by a single operator and is easy to operate.

4 Claims, 5 Drawing Sheets

(56) References Cited

FOREIGN PATENT DOCUMENTS

| | | |
|---|---|---|
| DE | 7202338 U | 4/1972 |
| DE | 4238003 C1 | 1/1994 |
| ES | 2367067 A1 | 10/2011 |
| ES | 1099305 U | 2/2014 |
| FR | 3056332 A1 | 3/2018 |
| JP | S61-14886 A | 1/1986 |
| WO | 2016046109 A1 | 3/2016 |

* cited by examiner

TROLLEY FOR INSPECTING RAILWAY CONSTRUCTION PARAMETERS

CROSS REFERENCE TO RELATED APPLICATION

This Application is a 371 of PCT/ES2019/070066 filed on Feb. 7, 2019, the contents of which are incorporated herein by reference.

OBJECT OF THE INVENTION

The object of the present invention is, as the title establishes, a trolley for inspecting railway construction parameters which functions as a platform for the integration of different sensors.

The present invention is characterised by the special constructive and functional features, as well as the interoperability of the different elements, such that they make it a trolley which, when folded, has reduced dimensions.

Therefore, the present invention is circumscribed within the scope of what is known as carts for measuring railway construction parameters, such as, for example, among others, parameters regarding tracks, overhead contact lines, gauges, signalling systems, energy and communications, etc.

BACKGROUND OF THE INVENTION

In the state of the art there are several devices designed for the analysis of the railway elements.

Among the most relevant documents are:

ES1099305 which discloses a device for measuring, without contact, parameters of the overhead contact line.

ES2367067 which discloses an auscultation device for overhead contact lines which is bimodal and without contact.

DE7202338 which discloses a trolley which runs along a railway that analyses the overhead contact line, but with contact.

Among other documents belonging to the state of the art, it is worth highlighting: WO2016046109, CN 105316986, FR3056332, DE4238003.

In all known devices, each with the variants and particular features thereof, there is a limiting factor common to all of them, which is their dimensions in order to be able to be transported from one place to another in a simple manner, both in the field by the operator and for the transport thereof to the measurement site in a vehicle.

None of the known devices addresses this functionality, which however complicates and limits the use thereof, since in the case of having relatively large dimensions it makes the transfer thereof to the places where it can be used difficult.

Therefore, the object of the present invention is to overcome the aforementioned functional drawbacks of having increased dimensions in order to be able to be transported in a simple and comfortable manner to the place of use, without detriment to the functional features thereof, by developing a trolley like the one described below and is stated in its essential nature in the first claim.

DESCRIPTION OF THE INVENTION

The object of the present invention is a trolley for inspecting railway construction parameters wherein the trolley comprises two frames, left and right, joined by a central body, wherein each frame is provided with a running assembly mounted on the free ends of the frames, and wherein a telescopic column emerges from the central body, the final section of which has a handle for operating the trolley and a tray for resting control equipment, such as a computer.

A particular feature of the trolley object of the invention is the fact that the left and right frames are joined in an articular manner, being able to be folded up to 90°, both frames being in a parallel arrangement, furthermore, the running assemblies also have an articulated joint with the free ends of the frames, such that they can be folded until they are aligned with the frames, and also the tray with respect to the telescopic column and the latter is foldable with respect to the central body until it touches the top plane of the frames. This folding results in an assembly with an optimal packing factor, thus enabling the available volume of the compartment wherein it is transported to the measurement site to be taken advantage of as much as possible.

On the trolley and in the different possible places, either in the central body or in the inner space of the frames, an area is reserved in order to house the different sensors which are installed. The articulated joints of the left and right frames with the central body enable a continuity and leak-tightness of the cabling thanks to bellows-type connections. In this manner, reserving a sufficient length in the connection cables, the folding and unfolding of the equipment is performed with the cabling protected at all times by the bellows, and without needing to disconnect any cables.

The gaskets between the different subsystems and holes, which communicate the inside of the frames with the outside, are insulated against humidity and dust by means of airtight sealing.

The design of the right and left running support subsystems enables the simple implementation of auxiliary mechanical elements for different sensors (i.e., measuring wheels for movement sensors by means of contact with the rail/rails).

Finally, the design incorporates a set of functionalities, elements and features which facilitate the usability thereof (optimised weight thanks to the combined use of plastic elements and structures, preferably light ones, such as those made of aluminium alloy, handgrips for handling and transport, wheels with a running profile optimised for railway applications, height-adjustable telescopic handle . . . ).

Therefore, thanks to the features described, a trolley for inspecting railway parameters is achieved which provides the following functional advantages:

It is portable, since when folded it has dimensions compatible with the dimensions of the boot of a passenger car.

It is not necessary to disconnect and connect any sensors for the folding and unfolding, respectively.

Allows handling with a single operator.

Putting the device on the track is simple.

The design of the running profile facilitates the machining thereof both in insulating materials (i.e., plastic) and conductor materials (i.e., steel), such that, depending on the requirements set by the competent railway administration, it may or may not interfere with the railway signalling systems based on track circuits.

Except when indicated otherwise, all of the technical and scientific elements used in this specification have the meaning commonly understood by a person with average skill in the art to which this invention belongs. When this invention is put into practice, methods and materials may be used that are similar or equivalent to the ones described in the specification.

Throughout the description and the claims, the word "comprise" and its variants are not intended to exclude other technical features, additions, components or steps. For those skilled in the art, other objects, advantages and features of the invention will be deduced from both the description and the practical use of the invention.

DESCRIPTION OF THE FIGURES

As a complement to the description provided herein, and for the purpose of helping to make the features of the invention more readily understandable, in accordance with a preferred practical exemplary embodiment thereof, said description is accompanied by a set of drawings which, by way of illustration and not limitation, represent the following.

PREFERRED EMBODIMENT OF THE INVENTION

In light of the figures, a preferred embodiment of the proposed invention is described below.

Figure 1:
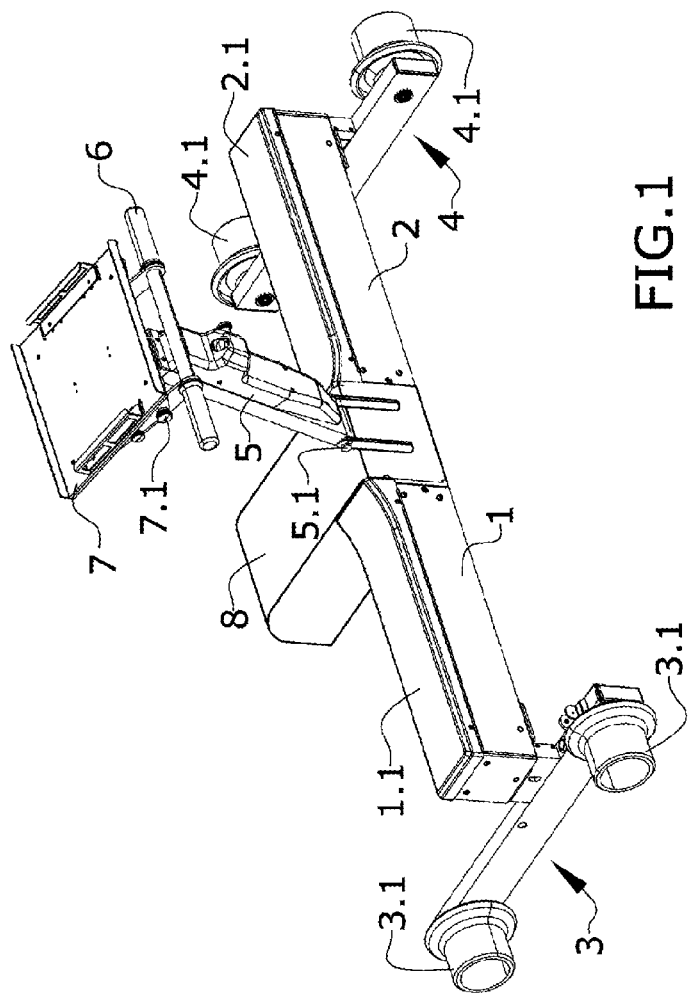
FIG. 1 shows a representation in general perspective of the trolley object of the invention.
Figure 2:
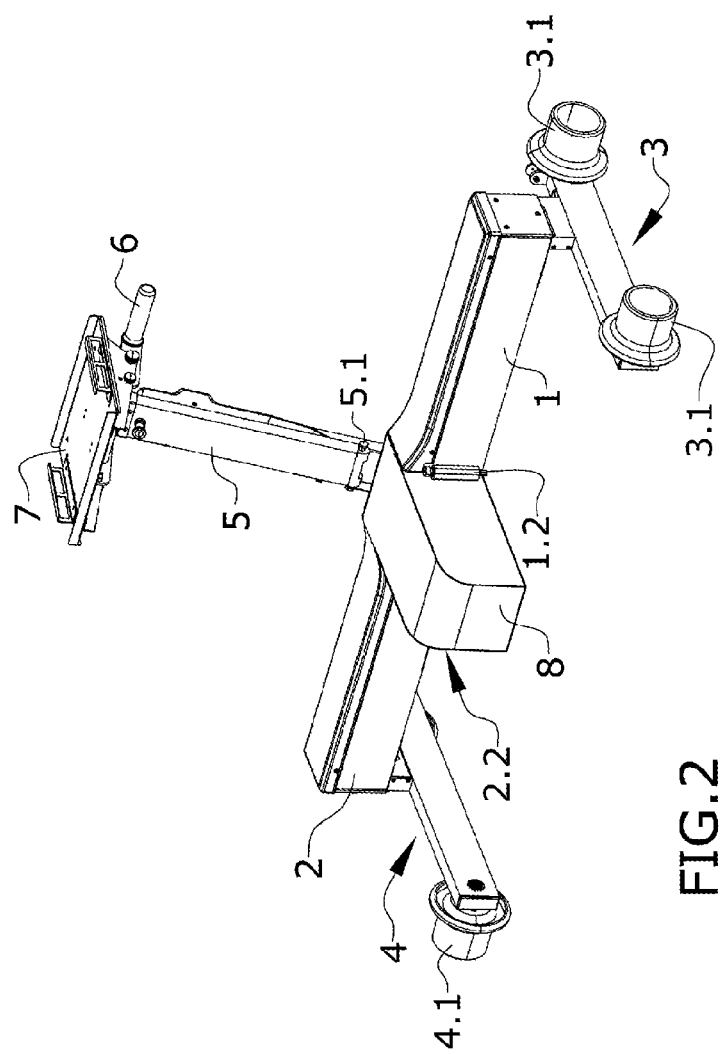
FIG. 2 shows the previous trolley for inspecting railway lines in another different view.

FIGS. 1 and 2 show that the trolley for inspecting railway construction parameters comprises:

A central body (8).

A left frame (1) (named for the position it occupies as seen by a person who handles the trolley from the handle) joined with the central body (8) on the left side of the central body (8).

A right frame (2) joined with the central body (8) on the right side of the central body (8).

A left running assembly (3) mounted on the free end of the left frame (1) transversely to the left frame (1) and wherein this left frame (1) is provided with a series of wheels (3.1).

A right running assembly (4) mounted on the free end of the right frame (2) and which is provided with a series of wheels (4.1).

A telescopic column (5) joined at the lower end thereof with the central body (8).

A tray (7) joined to the free end of the telescopic column (5).

A handle (6) joined to the free end of the telescopic column (5).

Wherein both the left frame (1) and the right frame (2) are joined with the central body (8) by means of articulated joints (1.2) and (2.2), respectively, such that both frames can be folded 90° with respect to the working position thereof until they are parallel with each other, wherein the articulated joints are made by means of hinges.

Furthermore, the left frame (1) and the right frame (2) each have a rectangular prismatic configuration inside of which there is a free space wherein elements are housed and enabling the passage of cables, being able to access the inside thereof through detachable covers (1.1) and (2.1), respectively.

Also, the left running assembly (3) and the right running assembly (4) are joined in an articular manner with respect to the free end of the left (1) and right frames (2), respectively. In the working position, the left running assembly (3) and the right running assembly (4) are fastened in a transverse arrangement in relation to the respective frames thereof to which they are joined. The fastening of the left (3) and right running assemblies (4) can be released, these running assemblies being able to rotate up to 90° with respect to a vertical axis until they are aligned with the respective frames thereof.

The telescopic column (5) at the lower end thereof is joined in an articular manner by means of an articulated joint (5.1) with the central body, and this telescopic column (5) has at least one section removable from the inside of the column, with the object of being able to adjust the use of the trolley to the height of the user and when it is collected, occupy the least volume possible. Moreover, the tray (7) is a horizontal tray which can be folded up to 90° thanks to a joint by means of an articulation (7.1) with the final end of the unfoldable section of the telescopic column (5).

Therefore, thanks to the articulated joints (1.2) and (2.2) of the left and right frames with the central body (8), to the possibility of being able to fold the left (3) and right running assemblies (4) with respect to the left (1) and right frames (2) until they are aligned underneath them, to the fact that the tray (7) can be folded with respect to the telescopic column (5) and to the fact that the telescopic column (5) can in turn be folded until it is made to coincide with the top planes of the right and left frames, the assembly, once folded, adopts a prismatic configuration with reduced volume which can be housed in a transport case and therefore is easily transportable in any vehicle.

Figure 3:
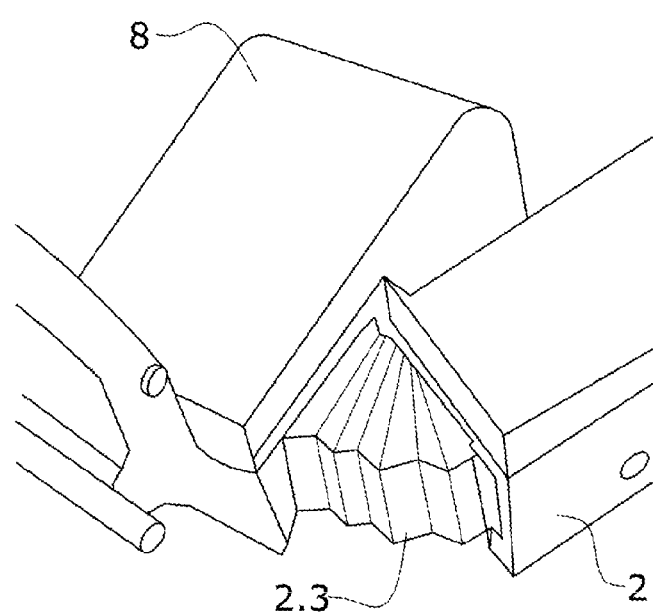
FIG. 3 shows a detail of the protected joint between a frame and the central body.

FIG. 3 shows how the joints of the ends of each frame, left (1) and right (2), with the central body are made by means of a bellows (1.3) which protects the interior cabling when folding and prevents the cables from being trapped when opening, it not being necessary to disconnect any sensors.

The articulated joints which enable the folding of the specified elements are made such that the cabling is protected at all times. Likewise, the joining cabling between the sensors and control units has sufficient dimensional clearance so that it is not necessary to disconnect any sensors both in the folding and the unfolding.

Figure 4:
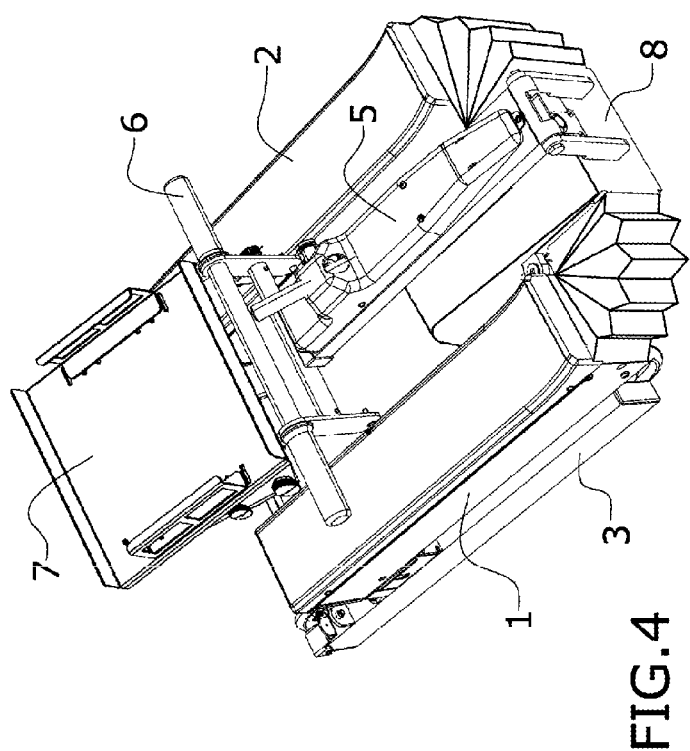
FIG. 4 shows the trolley object of the invention completely folded.

FIG. 4 shows the trolley completely folded, adopting a final prismatic configuration with reduced dimensions, wherein the possibility of being folded in the manner shown does not limit the final functional requirements thereof, and it not being necessary to disconnect any of the sensors in order to proceed with the folding, and the cabling being protected at all times and without being subjected to stresses.

Figure 5:
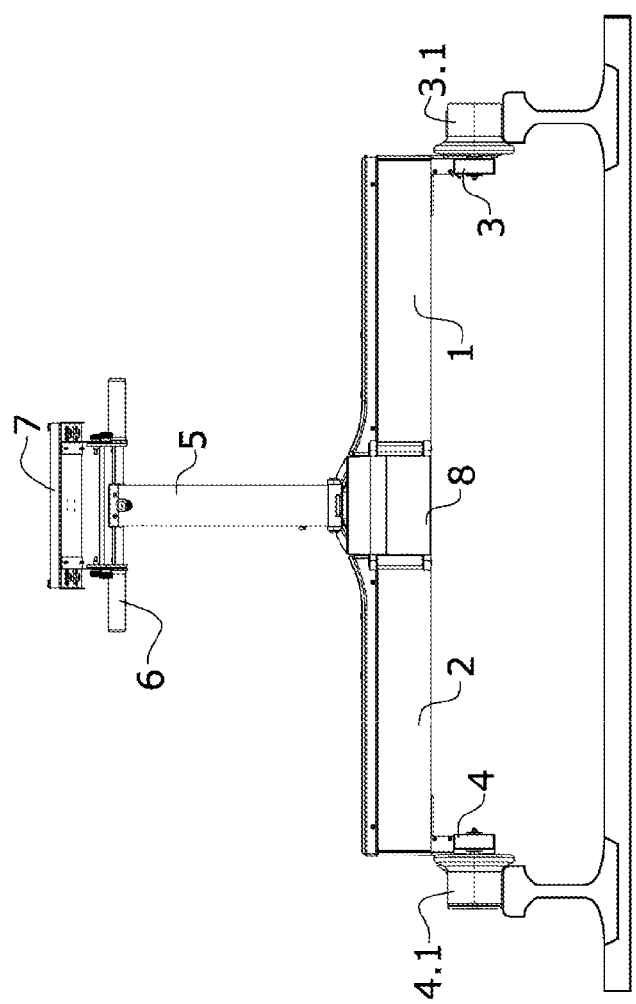
FIG. 5 shows a front view of the trolley mounted on the track rails.

FIG. 5 shows the trolley object of the invention in the unfolded position mounted on the rails of the railway, wherein a portion of the elements making up part of the trolley can be seen.

Having thus adequately described the nature of the present invention, as well as how to put it into practice, it must be noted that, within its essential nature, the invention may be carried out according to other embodiments differing in detail from that set out by way of example, which the protection sought would equally cover, provided that the fundamental principle thereof is not altered, changed or modified.

The invention claimed is:

1. A trolley for inspecting railway construction parameters comprising:

a central body;

a left frame joined with the central body on a left side of the central body;

a right frame joined with the central body on a right side of the central body;

a left running assembly mounted on a free end of the left frame transversely to the left frame and wherein the left running assembly is provided with a first series of wheels;

a right running assembly mounted on a free end of the right frame transversely to the right frame and wherein the right running assembly is provided with a second series of wheels;

a telescopic column joined at a lower end of the central body;

a tray joined to a free end of the telescopic column;

a handle joined to the free end of the telescopic column; wherein the left frame and the right frame are joined with the central body by means of articulated joints, wherein the articulated joints are made by hinges foldable 90° with respect to the working position thereof until the left frame and the right frame are parallel with each other;

the left running assembly and the right running assembly are joined in an articular manner with respect to the free end of the left and right frames, respectively, such that the left running assembly and right running assembly are foldable 90° with respect to a vertical axis until each of the left and right running assembly is aligned with and joined to underneath the left and right frames;

the tray is foldable until touching the telescopic column;

the telescopic column is joined in an articular manner with the lower end the central body;

the articulated joints are designed such that the cables passing through are protected at all times and said cables are long enough so that the trolley can be folded and unfolded.

2. The trolley for inspecting railway construction parameters according to claim 1, wherein the telescopic column at the lower end thereof is joined in an articular manner by means of an articulated joint with the central body and is foldable until it coincides with the top plane of the left and right frames.

3. The trolley for inspecting railway track construction parameters according to claim 1, wherein the left frame and the right frame each has a rectangular prismatic configuration inside of which there is a free space wherein elements are housed and enabling the passage of cables, being able to access the inside thereof through detachable covers.

4. The trolley for inspecting railway construction parameters according to claim 1, wherein the joints of the ends of each of the left frame and right frame with the central body are made by means of a bellows.

* * * * *